April 28, 1931.  J. COTAL  1,803,235
CLUTCHING AND SPEED CHANGING DEVICE
Filed Feb. 12, 1926
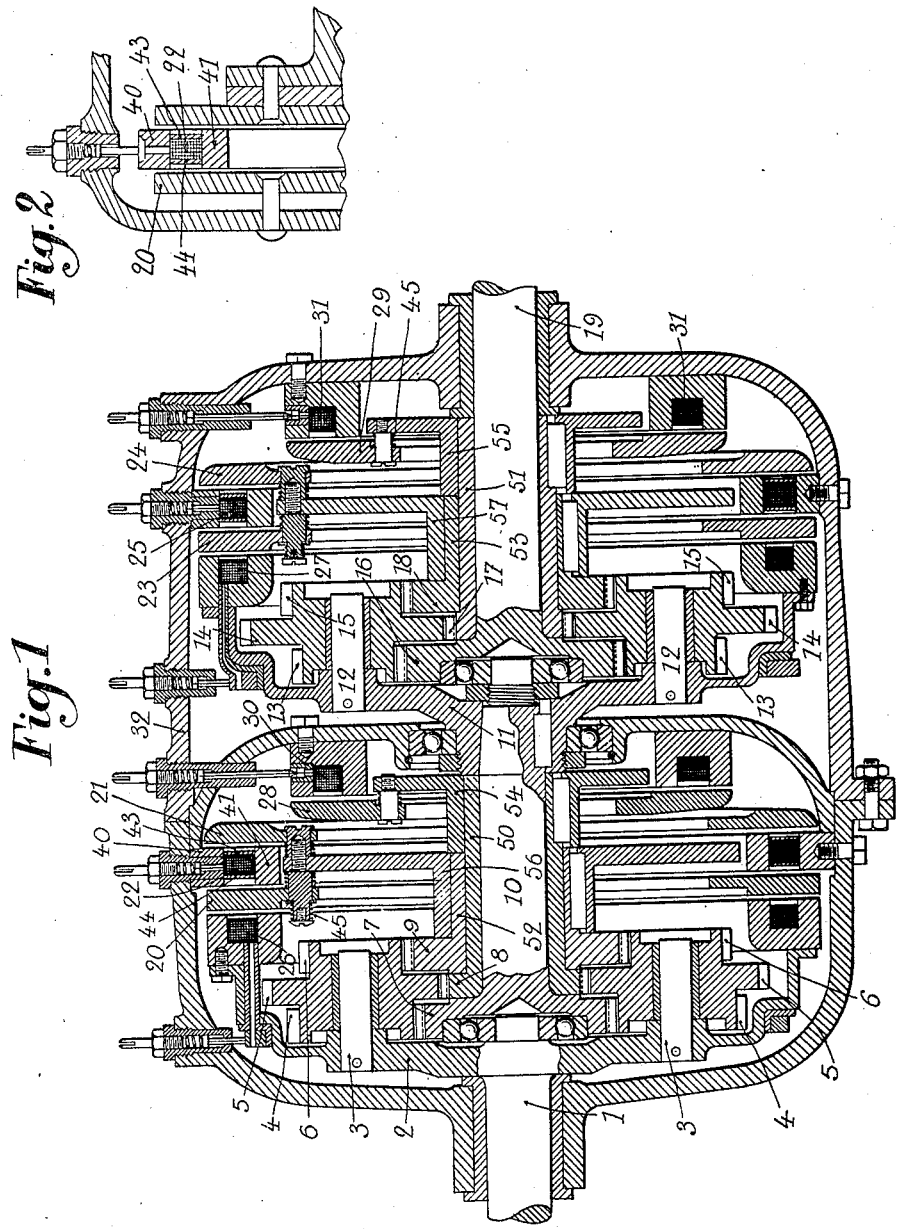
J. Cotal
INVENTOR
By: Marks & Clerk
Attys Patented Apr. 28, 1931

1,803,235

UNITED STATES PATENT OFFICE

JEAN COTAL, OF PARIS, FRANCE, ASSIGNOR TO SOCIETE D'EXPLOITATION DES BREVETS COTAL, OF PARIS, FRANCE

CLUTCHING AND SPEED-CHANGING DEVICE

Application filed February 12, 1926, Serial No. 87,884, and in France February 25, 1925.

Clutching and speed-changing devices are already known in which electrically-controlled electro-magnets hold fast or release at will toothed pinions which are in constant engagement and suitably disposed.

In the case of large gear ratios, the electro-magnets and their armatures should be designed so as to withstand very heavy reactions and, for that reason, their size, weight and cost become prohibitive for the apparatus of moderate power such as motor vehicles.

The present invention relates to an improved electro-magnetic clutching and speed-changing device capable of furnishing a large scale of gear ratios without requiring constituent parts of any great size. In this device, one or more of the electro-magnets utilized are each provided with two movable armatures which are connected with each other and are disposed on either sides of the winding.

This device may be also constructed by the juxtaposition of several sets of similar mechanisms which are mounted in series and in each of which the speeds are preferably graduated according to different scales.

According to circumstances, the desired resulting speed may be obtained either by reduction gearing—with or without reversing mechanism—which is obtained by one of the sets of mechanisms whilst the other set or sets operate by direct drive, or by the combination of the several gear ratios of each mechanism.

In each mechanism, the driving shaft is fast to a disc carrying planetary pinions which are in constant gear engagement with the sun gears, whereof one is secured to the driven shaft and the other may be held fast upon the said disc by electro-magnetic means, in order to obtain the direct drive.

By the use of several mechanisms in series, it is possible to divide the desired gear ratio into fractional parts and to consequently reduce the reaction stresses to a like degree. It is well known, in fact that in any epicyclic train, the reaction torque corresponding to the sun gear which is held fast in order to obtain the desired speed is equal to the algebraic difference between the resisting torque and the driving torque; for instance, in the case of a gear ratio of 4 to 1 for a forward drive, a driving torque equal to 1 will result in a resisting torque of 4 and a reaction torque of $4-1=3$; in the known devices, said reaction torque or stresses, which is very important in certain cases, are sustained by a single electro-magnet which has therefore inconveniently great dimensions. According to the present invention, said reaction torque or stresses are sustained either by a number of special electro-magnets of an improved type (with a double-armature) or by a number of ordinary electro-magnets between which said important reaction or stresses are subdivided, and which may be given therefore very adequate small dimensions; in particular, the arrangement of two armatures upon the same electro-magnet makes it possible to double the carrying area of same and to augment the maximum power transmission capacity of the apparatus.

By way of example, a constructional form of the device according to the invention is shown in lengthwise section in Fig. 1 of the appended drawing.

Fig. 2 shows a different arrangement of the double-armature electro-magnet.

In this constructional form, the primary shaft 1 carries an element or disc 2 upon which are mounted axles 3 upon which rotate a suitable number of planetary pinions 4, 5, 6 which are secured to each other and are respectively in gearing engagement with a suitable number of sun gears 7, 8, 9. One of the said sun gears, 7 for instance, is secured to an intermediate shaft 10 which is preferably situated in line with the shaft 1.

A disc 11 preferably similar to the disc 2 is secured to the shaft 10 and carries axles 12 upon which are rotatable a suitable number of planetary pinions 13, 14, 15 which are respectively in engagement with a suitable number of sun gears 16, 17, 18. One of the sun gears, 16 for instance, is secured to the secondary shaft 19 which is preferably in line with the shafts 1 and 10.

The sun gears 8, 9, 17, 18 are secured to concentric hollow shafts such as 50, 52, 51, 53 carrying sleeves such as 54, 56, 55, 57 which are provided with armatures 20, 21, 23, 24, 28, 29 which are enabled, by means of springs such as 45 to move slightly in a direction parallel with the driving axle. The sun gear 9 is secured to two armatures 20, 21 situated on each side of a special electro-magnet 22.

This special electro-magnet is preferably constituted by two concentric rings of magnetic metal 40 and 41 and in the annular space between said rings is disposed the energizing coil 22 which is held in place for instance by two cheeks 43, 44 of non-magnetic material which are suitably attached to the rings 40, 41 which are thus secured together and form a device which is mounted on the wall of the casing 32 of the apparatus.

Since the improved electro-magnet is provided with two armatures, when it is energized the area in contact will be double what can be obtained with a single armature, so that the adhesion will be augmented proportionally without increasing the length of the magnetic circuit and the weight and outside dimensions of the device.

On the sun gear 18 are similarly secured two armatures 23 and 24 situated on each side of another special electro-magnet 25 composed in the same manner as the electro-magnet 22 with like advantages. It is obvious that any of said special electro-magnets might present any other preferred arrangement, having, for instance, one or two fixed armatures and rotary rings and winding, as represented in Fig. 2 of the appended drawing.

In these two successive sets of elements, the armature 20 and the armature 23 may be also respectively held fast against the rotary electro-magnets 26 and 27 which are mounted on the discs 2 and 11, these being supplied with electric current by a well known device comprising slip rings and brushes.

The sun gears 8 and 17 carry the respective armatures 28, 29 of the two electro-magnets 30, 31 which are preferably mounted on the walls of the casing 32 provided for the whole device.

The device as illustrated may be operated in the following manner:

*Sixth or highest speed in direct drive.*—To obtain the transmission in direct engagement, the current is sent into the rotary electro-magnets 26, 27 by means of a controller and suitable conductors not shown. The electro-magnet 26 actuates the sun gear 9 by means of the armature 20. The epicyclic train or gearing of which the said sun gear forms a part is thus held together and is actuated both by the axles 3 of the planetary pinions, and by the sun gear 9, so that the whole set of gearing and hence the intermediate shaft 10 rotate at the same speed as the main or primary shaft 1. The electro-magnet 27 actuates the sun gear 18 by means of the armature 23. In the same manner as above explained for the first set of gearing, one obtains in this second set, upon the secondary shaft 19, a speed equal to that of the intermediate shaft 10, i. e. equal to that of the driving shaft 1.

*Fifth speed combination.*—The electro-magnets 26 and 31 are energized. In the same manner as above set forth for the first set of gearing in the preceding combination, the intermediate shaft 10 rotates at the same speed as the driving shaft 1. The electro-magnet 31, by its armature 29, holds fast the sun gear 17 around which the planetary pinions 14 will now turn, drawing with them the other planetary pinions in their rotation about their axles 12.

Since the planetary pinions 13 are engaged with the sun gear 16, and since the planetary pinions 13 have a much smaller diameter than the planetary pinions 14, the shaft 19 will be driven in the same direction as shaft 10 at a speed which is somewhat below that of the shaft 10 and hence below that of the main driving shaft 1.

*Fourth speed combination.*—The electro-magnets 30 and 27 are energized. The electro-magnet 30, by means of its armature, will hold the sun gear 8 about which the planetary pinions 5 will now rotate drawing with them the other planetary pinions in their rotation about the axles 3. The planetary pinions 4 are engaged with the sun gear 7 and since the planetary pinion 4 is much smaller than the planetary pinion 5, the intermediate shaft 10 will be actuated at a speed below that of the shaft 1. By means of the electro-magnet 27, as previously set forth for the sixth speed combination, the secondary shaft 19 is driven at the same speed as the shaft 10, i. e. at a speed below that of the main driving shaft 1. The resulting speed of the secondary shaft is slightly below what is obtained in the preceding case.

*Third speed combination.*—The electro-magnets 30 and 31 are energized. By means of the electro-magnet 30, as previously set forth for the fourth speed combination, the sun gear 8 is held fast, and by the action of the epicyclic train or gearing, the intermediate shaft 10 is driven at a speed below that of the driving shaft 1. Due to the electro-magnet 31, the sun gear 17 is held fast, and as in the case of the fifth speed combination, by means of the epicyclic gearing, the secondary shaft 19 will now be driven at a speed below that of the shaft 10 and a fortiori below that of the shaft 1. There is a double speed reduction, and the resulting speed of the secondary shaft is somewhat below what is obtained with the fourth speed combination.

*Second speed combination.*—The electro-magnets 26 and 25 are energized. Due to the electro-magnet 26, as observed for the sixth and for the fifth speeds, there will be obtained for the shaft 10 a speed equal to that of the primary shaft 1. The electro-magnet 25, by means of its double armature 23—24 which has now made contact,—and herein a strong energetic braking torque ought to be obtained—holds fast the sun gear 18 about which the planetary pinions 15 will now rotate. The planetary pinions 13 are in gearing engagement with the sun gear 16, and since the planetary pinions 13 are not much smaller than the planetary pinions 15, the resulting speed of the secondary shaft 19 will be much below that of the shaft 10 and therefore below that of the primary shaft 1. The said resulting speed will be below the third speed.

*First speed combination.*—The electro-magnets 30 and 25 are energized. The electro-magnet 30 as mentioned for the fourth speed, imparts to the shaft 10 a speed which is below that of the shaft 1. The electro-magnet 25 as set forth for the second speed, imparts to the shaft 19 a speed which is much below that of the shaft 10. This double reduction of speed between shaft 1 and the secondary shaft 19 permits to obtain on the latter shaft a very slow speed which is less than the speed which is obtained in the case of the second speed.

*Reverse speed combination.*—The electro-magnets 22 and 31 are energized. The electro-magnet 22 attracts its double armature 20, 21—and in this case the reaction torque ought to be also very strong—and will hold the sun gear 9 about which the planetary pinions 6 will now rotate. The planetary pinions 4 are engaged with the sun gear 7, and since the planetary pinions 4 have a larger diameter than the planetary pinions 6, the shaft 10 will be driven at a reduced speed in a direction contrary to that of the primary shaft 1. As stated with reference to the fifth speed, electro-magnet 31, will impart to the shaft 19 a speed below that of the shaft 10. Since the shaft 10 rotates in a direction contrary to that of the shaft 1, the actuated shaft 19 will also rotate in a direction contrary to the primary shaft, but at a more reduced speed than that which is obtained directly upon the shaft 10.

To provide for reverse speeds which are faster or slower than the one above mentioned, the electro-magnets 22 and 27 or the electro-magnets 22 and 25 might be energized simultaneously.

*General uncoupling.*—In this event, none of the electro-magnets is energized, and if the primary shaft 1 is now in motion, the sun gears 7, 8, 9, 17 and 18 will rotate loosely, so that the secondary shaft 19 will not be actuated.

In particular the scope of application of the double armature electro-magnet is obviously not limited to clutches or change speed devices, but may further comprise electro-magnetic brakes for shaft, wheels, etc.; in certain cases, however, it will be preferable to arrange the various parts of said double armature electro-magnet in a manner different from that represented either in Fig. 1 or 2.

Obviously, the present invention is not limited to the form of construction herein set forth or the operation as described above and, without departing from the principle of the invention, other constructional forms may be employed; furthermore, in certain cases, a series of more than two mechanisms or sets of gearing may be used to advantage and, to the contrary, in particular for small power units, the series arrangement of two mechanisms may become useless, and the electro-magnet with double armature will be able to withstand the reaction while remaining within the normal dimensions. For like purposes, electro-magnets with a single armature may be substituted for the double armature magnets and the desired speed reduction or multiplication may be obtained by the series mounting of two or more mechanisms.

Having now described my invention, what I claim as new and desire to secure by Letters Patent is:

In a clutching and speed changing device, the combination of a driving shaft, a driven shaft, a sun gear secured on the driven shaft and another sun gear loosely rotatable on said driven shaft, a planet carrier secured on said driving shaft, at least two rows of planetary pinions on said carrier, one of said rows meshing with the fixed sun gear and the other row with the loose sun gear, a stationary electro-magnet having a magnetic circuit with two interruptions, two movable armatures disposed opposite the two interruptions of said magnetic circuit and adapted to be simultaneously attracted by said electro-magnet, a support for said armatures on which said armatures are adapted to slide towards and away from said electro-magnet, means operatively connecting said support and said loose sun gear, an electro-magnet carried on said planet carrier near one of said armatures and adapted to clutch said armature to the planet carrier.

In testimony whereof I have signed my name to this specification.

JEAN COTAL.